(12) United States Patent
Hyatt et al.

(10) Patent No.: US 10,598,221 B2
(45) Date of Patent: Mar. 24, 2020

(54) PERMANENT MAGNET THRUST BEARING

(71) Applicant: GE Oil & Gas ESP, Inc., Oklahoma City, OK (US)

(72) Inventors: James Hyatt, Houston, TX (US); Michael Franklin Hughes, Oklahoma City, OK (US); Connor Hayes, Houston, TX (US); Erik Stephen Robbins, Houston, TX (US); Mohammad Chowdhury, Houston, TX (US); Hannah Kelly, Greenville, SC (US)

(73) Assignee: Baker Hughes Oilfield Operations, LLC, Houston, TX (US)

( * ) Notice: Subject to any disclaimer, the term of this patent is extended or adjusted under 35 U.S.C. 154(b) by 406 days.

(21) Appl. No.: 15/291,006

(22) Filed: Oct. 11, 2016

(65) Prior Publication Data

US 2018/0100543 A1 Apr. 12, 2018

(51) Int. Cl.
| | |
|---|---|
| *F16C 32/04* | (2006.01) |
| *F04D 29/048* | (2006.01) |
| *H02K 5/132* | (2006.01) |
| *F04D 13/10* | (2006.01) |
| *F04D 29/041* | (2006.01) |

(Continued)

(52) U.S. Cl.
CPC ........ *F16C 32/0427* (2013.01); *E21B 43/128* (2013.01); *F04D 13/10* (2013.01); *F04D 29/041* (2013.01); *F04D 29/048* (2013.01); *H02K 5/132* (2013.01); *F04D 29/106* (2013.01); *F16C 43/00* (2013.01); *F16C 2202/44* (2013.01); *F16C 2360/00* (2013.01); *F16C 2360/44* (2013.01)

(58) Field of Classification Search
CPC ........ H02K 7/09; H02K 5/132; F04D 29/048; F16C 32/0423; F16C 32/0427
USPC .......................................................... 310/90.5
See application file for complete search history.

(56) References Cited

U.S. PATENT DOCUMENTS 3,433,986 A * 3/1969 Arutunoff .............. H02K 5/132
310/87
3,614,181 A 10/1971 Meeks
(Continued)

FOREIGN PATENT DOCUMENTS

| EP | 0 728 262 A1 | 8/1996 |
|---|---|---|
| JP | S59-186520 U | 12/1984 |

(Continued)

OTHER PUBLICATIONS

International Search Report and Written Opinion issued in connection with corresponding PCT Application No. PCT/US2017/56049 dated Feb. 13, 2018.

*Primary Examiner* — Jeremy A Luks
(74) *Attorney, Agent, or Firm* — Crowe & Dunlevy, P.C.

(57) ABSTRACT

A magnetic thrust bearing is designed for use in a pumping system that includes a pump driven by a motor through a shaft. The magnetic thrust bearing includes one or more platters that remain stationary with respect to the shaft and one or more thrust discs connected to the shaft and interleaved with the one or more platters. Each of the one or more platters includes a plurality of platter magnets and each of the one or more thrust discs includes a plurality of thrust disc magnets. The magnets on the platters and thrust discs are configured to produce repulsive magnetic forces as the thrust discs approach the platters.

20 Claims, 5 Drawing Sheets

(51) Int. Cl.
  *E21B 43/12* (2006.01)
  *F04D 29/10* (2006.01)
  *F16C 43/00* (2006.01)

(56) References Cited

U.S. PATENT DOCUMENTS

| | | | | |
|---|---|---|---|---|
| 5,622,040 | A * | 4/1997 | Preutenborbeck | D01H 4/12 192/105 CD |
| 6,448,679 | B1 | 9/2002 | Imlach | |
| 8,581,463 | B2 * | 11/2013 | Post | F16C 32/0427 310/401 |
| 8,941,278 | B2 * | 1/2015 | Aronstam | F16C 32/0402 310/90.5 |
| 2004/0113502 | A1 | 6/2004 | Li et al. | |
| 2011/0058965 | A1 * | 3/2011 | Cunningham | F04D 1/063 417/410.1 |
| 2014/0035411 | A1 | 2/2014 | Kundel | |
| 2014/0347152 | A1 | 11/2014 | Aronstam et al. | |

FOREIGN PATENT DOCUMENTS

| | | |
|---|---|---|
| WO | 2014/133397 A1 | 9/2014 |
| WO | 2015/094364 A1 | 6/2015 |
| WO | 2016/089399 A1 | 6/2016 |

\* cited by examiner

PERMANENT MAGNET THRUST BEARING

FIELD OF THE INVENTION

This invention relates generally to the field of submersible pumping systems, and more particularly, but not by way of limitation, to an improved thrust bearing for a submersible pumping system.

BACKGROUND

Submersible pumping systems are often deployed into wells to recover petroleum fluids from subterranean reservoirs. The submersible pumping system includes one or more fluid filled electric motors coupled to one or more high performance pumps. When energized, the motor provides torque to the pump through a series of connected shafts. When rotated, the pump pushes wellbore fluids to the surface through production tubing in accordance with well-known fluid mechanics.

During operation, thrust generated by the pump is carried through the shaft to other components within the pumping system. Because the components within the pumping system are often closely positioned with very small tolerances, axial movement created by thrust from the motor or pump may cause adjacent components to come into contact. This contact may accelerate wear or cause immediate damage to the components within the pumping system.

In the past, designers have employed interference-based thrust bearings to carry the thrust created within the pumping system. Typical thrust bearings include a stationary portion affixed to a housing, a rotating portion affixed to the rotating shaft, and a pad positioned between these two portions. The pad resists axial motion between the stationary and rotating portions of the thrust bearing.

Although widely adopted, the use of traditional thrust bearings may be undesirable in certain applications. Because traditional thrust bearings require contact between the rotating and stationary portions of the thrust bearing, the components within the thrust bearing must be installed within prescribed tolerances. Additionally, as the thrust pads wear over time, the tolerances between adjacent components may change and the thrust bearing may become less effective at limiting axial movement along the shaft. There is, therefore, a need for an improved thrust bearing design that overcomes these and other deficiencies in the prior art.

SUMMARY OF THE INVENTION

In one aspect, the present invention includes a magnetic thrust bearing is designed for use in a pumping system that includes a pump driven by a motor through a shaft. The magnetic thrust bearing includes one or more platters that remain stationary with respect to the shaft and one or more thrust discs connected to the shaft and interleaved with the one or more platters. Each of the one or more platters includes a plurality of platter magnets and each of the one or more thrust discs includes a plurality of thrust disc magnets. The magnets on the platters and thrust discs are configured to produce repulsive magnetic forces as the thrust discs approach the platters.

In another aspect, the present invention includes an electric submersible pumping system that is designed for use in pumping fluids from a wellbore. The electric submersible pumping system includes a motor, a pump driven by the motor, and a thrust chamber connected between the motor and the pump. The thrust chamber includes a shaft and a magnetic thrust bearing. The magnetic thrust bearing includes one or more thrust discs connected to the shaft and one or more stationary platters. Each of the one or more thrust discs and each of the one or more platters produces a magnetic field.

In yet another aspect, the present invention includes an electric submersible pumping system that includes a motor, a pump driven by the motor, and a seal section connected between the pump and the motor. The seal section has a thrust chamber that includes a shaft and a magnetic thrust bearing. The magnetic thrust bearing includes one or more thrust discs connected to the shaft and one or more platters that are stationary with respect to the shaft. Each of the one or more thrust discs and one or more platters produces a magnetic field.

WRITTEN DESCRIPTION

Figure 1:
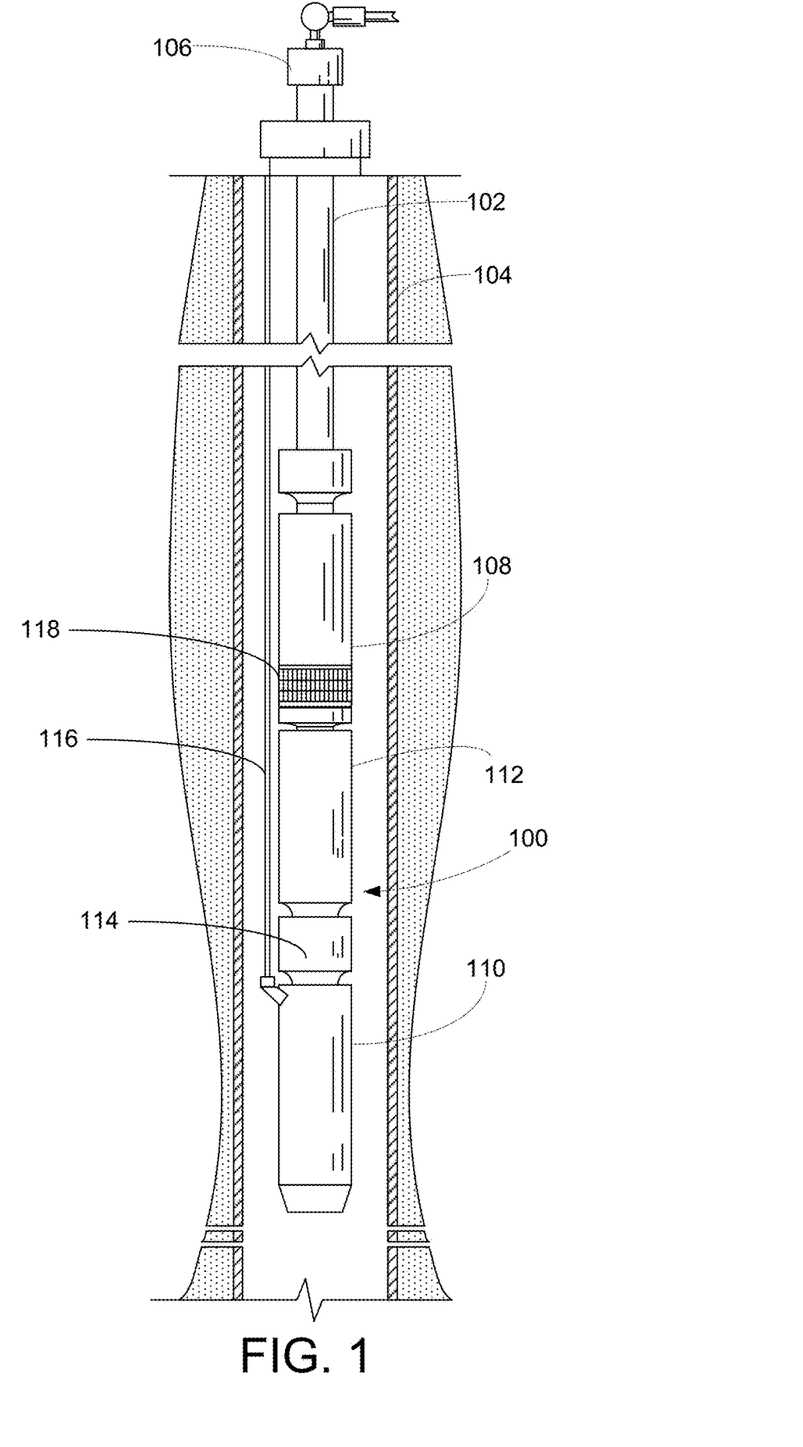
FIG. 1 depicts a submersible pumping system constructed in accordance with a preferred embodiment of the present invention.

In accordance with an embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas.

The pumping system 100 includes a pump 108, a motor 110, a seal section 112 and a thrust chamber 114. The production tubing 102 connects the pumping system 100 to a wellhead 106 located on the surface. Although the pumping system 100 is primarily designed to pump petroleum products, it will be understood that the pumping system 100 can also be used to move other fluids. It will also be understood that, although each of the components of the pumping system 100 are primarily disclosed in a submersible application, some or all of these components can also be used in surface pumping operations. Furthermore, although the pumping system 100 is depicted in a vertical deployment in FIG. 1, the pumping system 100 can also be used in non-vertical applications, including in horizontal and non-vertical wellbores 104. Accordingly, references to "upper" and "lower" within this disclosure are merely used to describe the relative positions of components within the pumping system 100 and should not be construed as an indication that the pumping system 100 must be deployed in a vertical orientation.

The motor 110 receives power from a surface-based facility through power cable 116. Generally, the motor 110 is configured to drive the pump 108. In some embodiments, the pump 108 is a progressive cavity pump or positive displacement pump. In other embodiments, the pump 108 is a turbomachine that uses one or more impellers and diffusers to convert mechanical energy into pressure head. The pump 108 includes a pump intake 118 that allows fluids from the wellbore 104 to be drawn into the pump 108. The pump 108 forces the wellbore fluids to the surface through the production tubing 102.

The seal section 112 provides several functions, including transmitting torque between the motor 110 and pump 108, restricting the flow of wellbore fluids into the motor 110 and accommodating the expansion and contraction of motor lubricant as the motor 110 moves through thermal cycles during operation and pressure equalization. The seal section 112 includes one or more internal fluid isolation mechanisms that provide a positive barrier between the clean lubricants in the motor 110 and the contaminated fluids in the wellbore 104. The seal section 112 may include some combination of labyrinth chambers, seal bags, pistons, bellows and other fluid isolation mechanisms. These fluid isolation mechanisms may be placed in series or in parallel within the seal section 112.

In the embodiment depicted in FIG. 1, the seal section 112 is positioned above the motor 110 and below the pump 108. The thrust chamber 114 is positioned between the motor 110 and the seal section 112. It will be understood that the thrust chamber 114 may be integrated within the housing of the seal section 112 or the motor 110, or configured as a separate component within the pumping system 100 (as depicted in FIG. 1). The thrust chamber 114 should be positioned within the pumping system 100 so that it can control the axial displacement of shafts used to transfer torque from the motor 110 to the pump 108.

Figure 2:
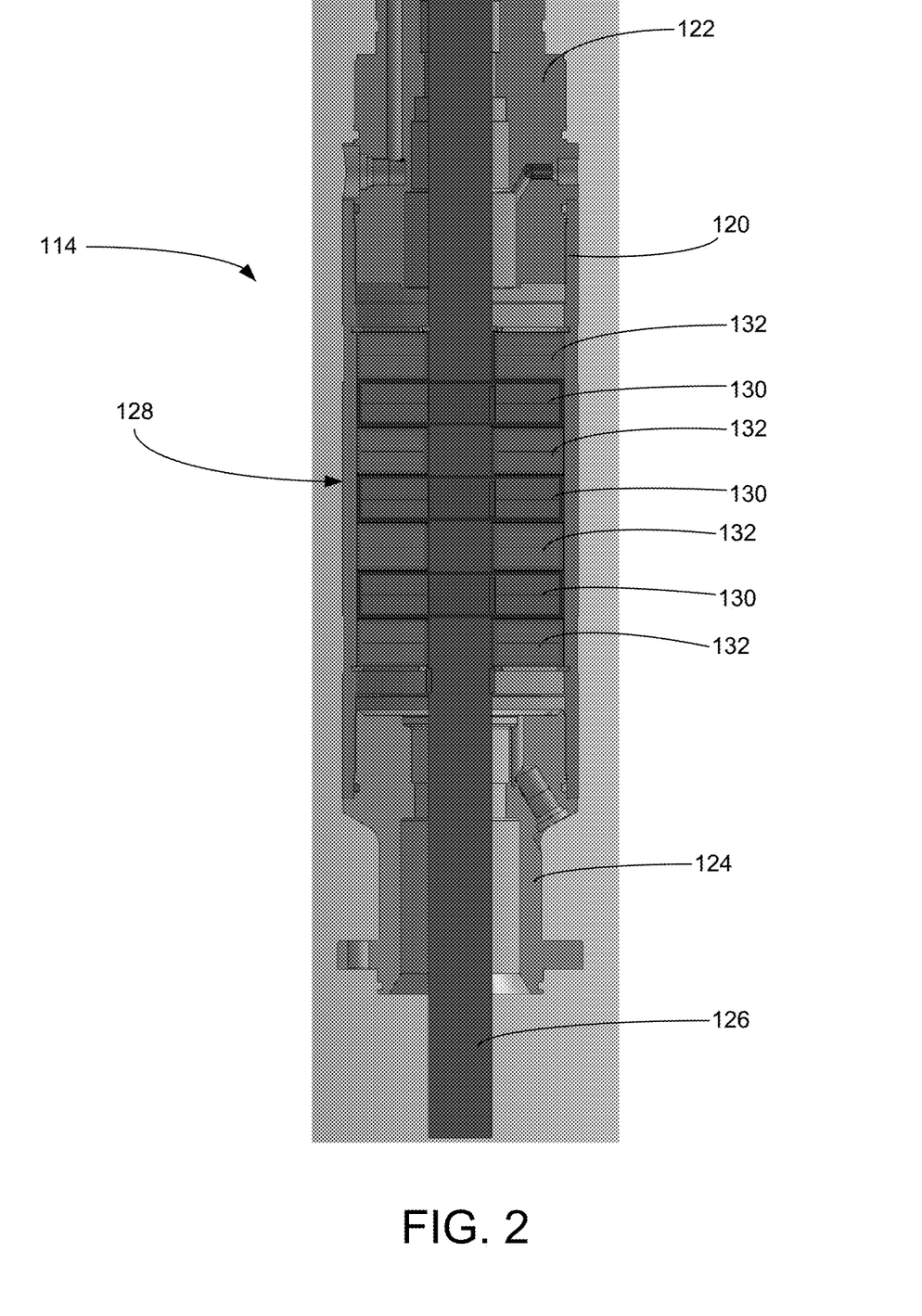
FIG. 2 provides a cross-sectional view of the thrust chamber of the pumping system of FIG. 1.

Turning to FIG. 2, shown therein is a cross-sectional view of the thrust chamber 114. The thrust chamber 114 includes a housing 120, a head 122, a base 124 and a shaft 126. The head 122 and base 124 are configured for secure engagement with the housing 120. The head 122 is configured to connect the thrust chamber 114 to an adjacent downstream component, such as the seal section 112. The base 124 is configured to connect the thrust chamber 114 to an adjacent upstream component, such as the motor 110. The shaft 126 transfers torque from the motor 110 to the seal section 112 and pump 108. The housing 120, head 122 and base 124 may be filled with a liquid lubricant during assembly.

The thrust chamber 114 includes a magnetic thrust bearing 128. The magnetic thrust bearing 128 generally includes one or more thrust discs 130 and one or more stationary platters 132. In exemplary embodiments, the thrust discs 130 and platters 132 are interleaved within the magnetic thrust bearing 128 in an alternating pattern. The thrust discs 130 are secured to the shaft 126 through a keyed, pinned or press-fit connection and configured for rotation within the thrust chamber 114. The platters 132 are secured in a stationary position within the housing 120. As illustrated in FIG. 2, there are three thrust discs 130 interleaved between four platters 132.

Figure 3:
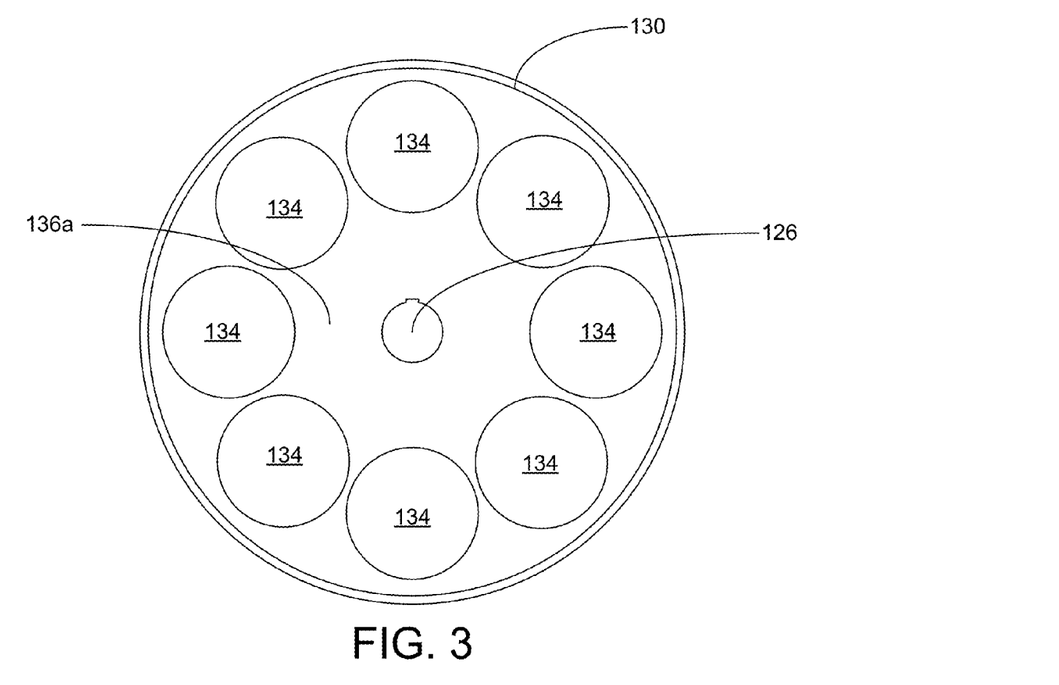
FIG. 3 is a front view of a first face of the thrust disc of the magnetic thrust bearing of FIG. 2.
Figure 4:
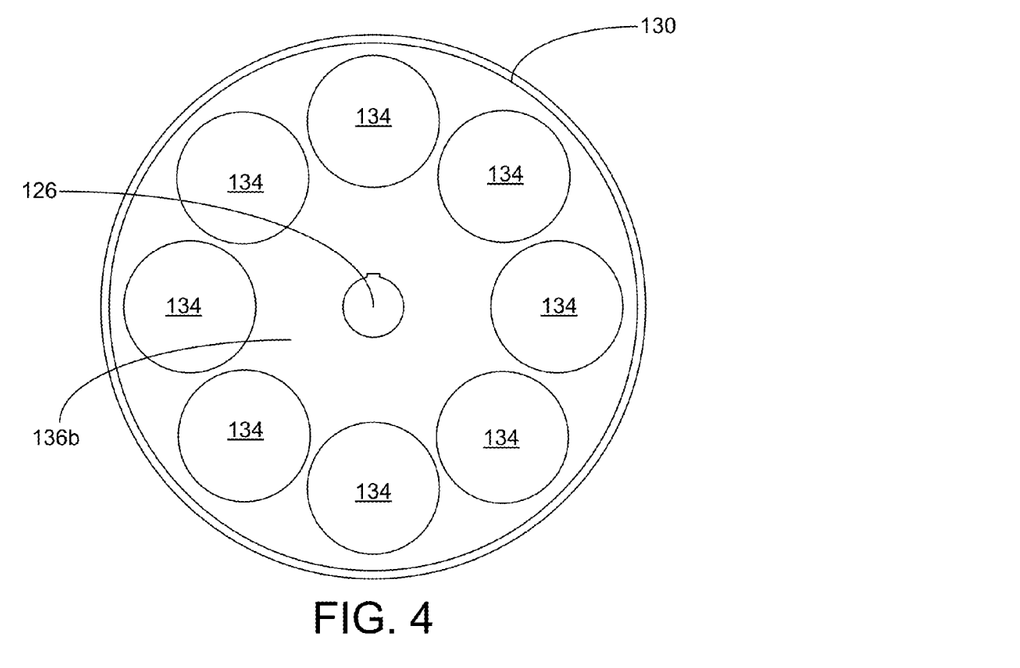
FIG. 4 is a back view of a second face of the thrust disc of FIG. 3.
Figure 5:
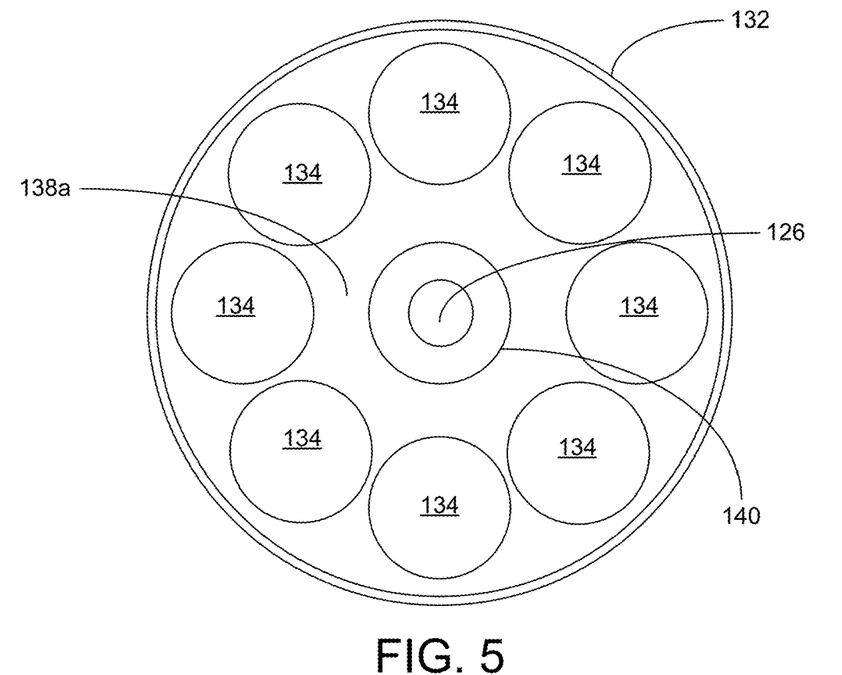
FIG. 5 is a front view of a first face of the platter of the magnetic thrust bearing of FIG. 2.
Figure 6:
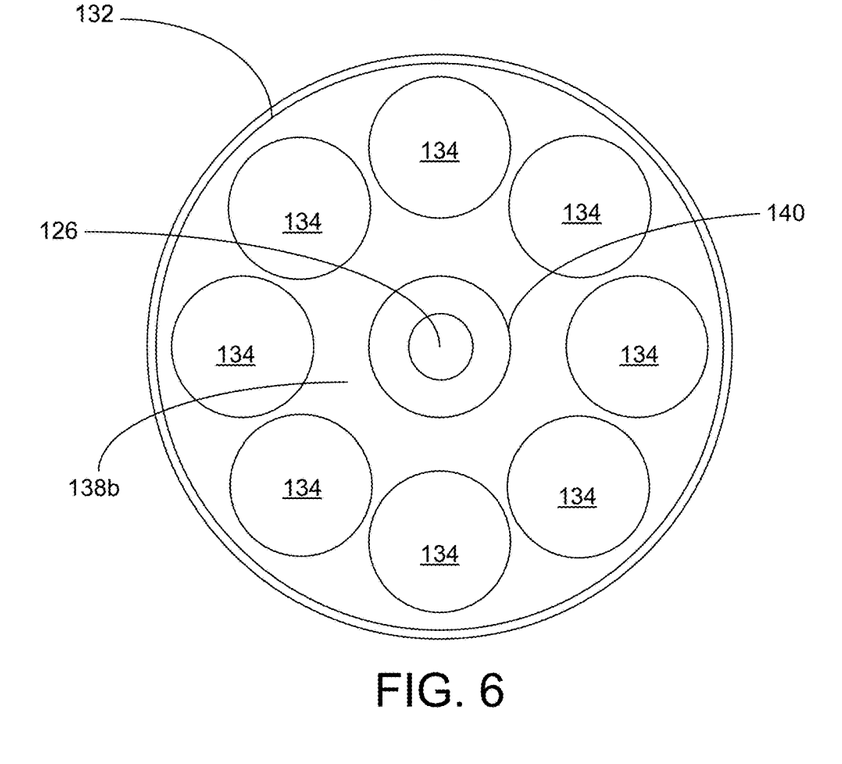
FIG. 6 is a back view of a second face of the platter of FIG. 5.

Turning to FIGS. 3 and 4, shown therein are front and rear views, respectively, of a thrust disc 130. The thrust disc 130 includes a plurality of magnets 134 arranged about the thrust disc 130. In the embodiment depicted in FIGS. 3 and 4, the magnets 134 are secured to both faces 136a, 136b of the thrust disc 130. In other embodiments, the magnets 134 are only secured to one face 136 of the thrust disc 130. Turning to FIGS. 5 and 6, shown therein are front and rear views, respectively, of a platter 132. The platter 132 also includes a plurality of magnets 134 arranged about the platter 132. The magnets 134 may be secured to both faces 138a, 138b of the platter 132 or to only one face 138 of the platter 132. As used herein, the term "thrust disc magnets" will refer to magnets 134 attached to, or embedded within, the thrust discs 130. The term "platter magnets" will refer to magnets 134 attached to, or embedded within, the platters 132.

The platter 132 further includes a central aperture 140 through which the shaft 126 extends without contacting the platter 132. Although eight magnets 134 are shown on the thrust disc 130 and platter 132 of FIGS. 3-6, it will be appreciated that the use of greater or fewer numbers of magnets 134 on the thrust discs 130 and platters 132 falls within the scope of the invention. Moreover, it will be appreciated that the size, shape, configuration and number of magnets 134 may differ between the thrust discs 130 and platters 132 within the magnetic thrust bearing 128.

Figure 7:
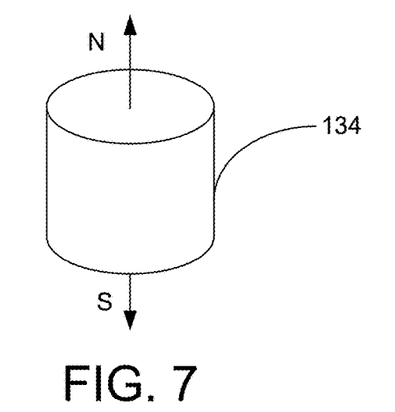
FIG. 7 is a perspective view of a magnet used on the thrust disc and platters shown in FIGS. 3-6.

Turning to FIG. 7, shown there is a side perspective view of an exemplary embodiment of the magnet 134. Each magnet 134 is a permanent magnet that produces magnetic fields with poles extending in substantially opposite axial directions. Suitable magnetic materials include nickel-plated rare-earth magnets, such as neodymium and alloys of neodymium, iron and boron. Although the magnets 134 may be cylindrical (as shown in FIG. 7), the magnets 134 may also be bar, box-type or ring magnets.

The magnets 134 can be secured to the thrust discs 130 and platters 132 with threaded fasteners, adhesive, clamps, brackets or other locking mechanisms. In some embodiments, the thrust disc 130 and platter 132 may include recessed magnet pockets (not shown) that are sized and shaped such that the magnets 134 are recessed, flush or only slightly protruding from the faces 136 of the thrust discs 130 and faces 138 of the platters 132. In other embodiments, the thrust discs 130 and platters 132 include bores through which the magnets 134 extend from one side to the other.

In yet other embodiments, the thrust discs 130 and platters 132 are constructed from magnetic materials or materials impregnated with magnetic particles and produce magnetic fields without the need for the magnets 134. In each case, the magnets 134 are oriented on the faces 136, 138 of the thrust discs 130 and platters 132 such that the poles of the magnetic fields produced by the magnets 134 are commonly aligned. For example, all of the magnets 134 on face 136a of thrust disc 130 are oriented such that the north magnetic pole of each magnet 134 extends away from the face 136a of the thrust disc 130.

Figure 8:
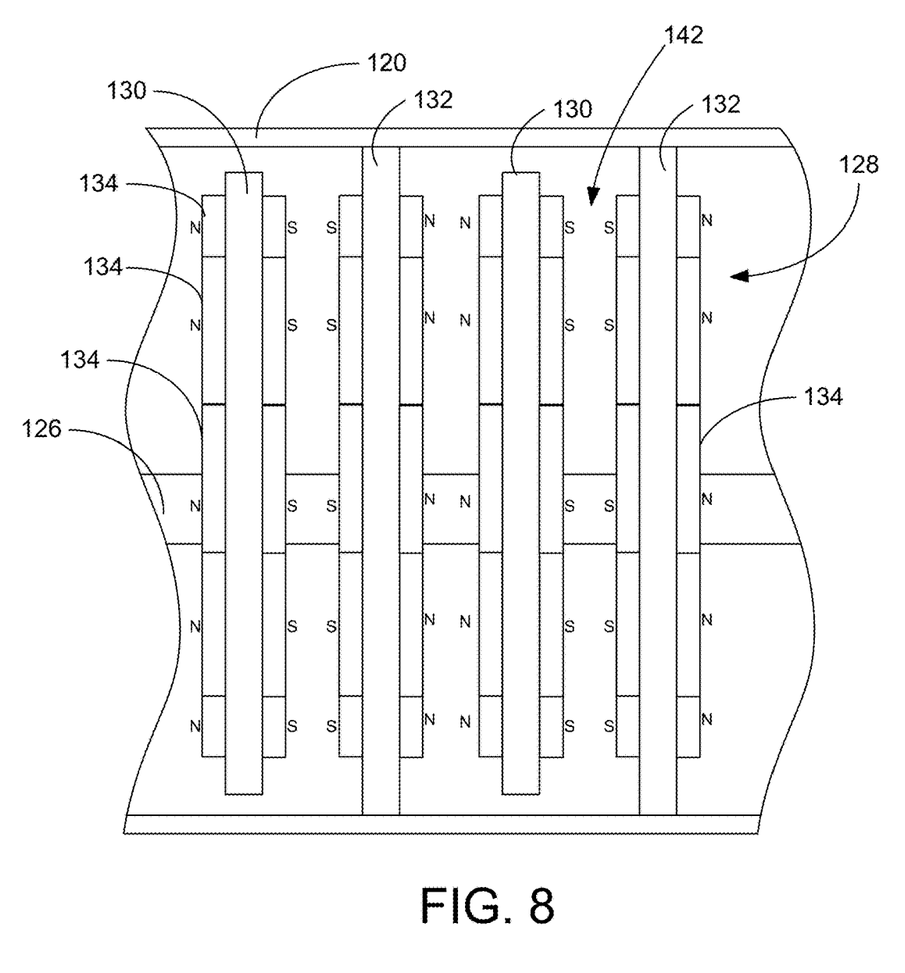
FIG. 8 is a partial cross-sectional view of the thrust chamber of FIG. 2 illustrating the magnetic fields produced by the thrust discs and platters.

FIG. 8 provides a side view of a portion of the magnetic thrust bearing 128 within the housing 120. The thrust discs 130 and platters 132 are arranged in an alternating, interleaved fashion within the magnetic thrust bearing 128. A small gap 142 is provided between each pair of thrust discs 130 and platters 132. Each thrust disc 130 and platter 132 is oriented within the magnetic thrust bearing 128 to produce a repelling magnetic force with an adjacent thrust disc 130 or platter 132. This repulsive force is produced by matching the polarity of the magnetic fields produced by adjacent thrust discs 130 and platters 132. The magnitude of the repulsive magnetic force increases as the distance between adjacent thrust discs 130 and platters 132 decreases. In this way, axial movement of the thrust discs 130 and shaft 126 is restricted by the repulsive force produced by the magnets 134 on the adjacent stationary platters 132.

Although a repulsive force is useful in opposing the approximation of the thrust discs 130 and platters 132, it may also be useful in certain applications to configure the magnetic thrust bearing 128 so that it produces an attractive force between the discs 130 and platters 132. For example, it may be useful in certain applications to offset the weight carried by the shaft 126 through the housing 120 with an attractive force produced between a disc 130 and a platter 132. The attractive magnetic force can be produced by orienting the magnets 134 on discs 130 and platters 132 with opposite magnetic poles on juxtaposing sides of the magnets 134. It will be appreciated that the magnetic thrust bearing 128 may include a first set of discs 130 and platters 132 that are configured to produce an attractive force and a second set of discs 130 and platters 132 that are configured to produce a repulsive force. To avoid cancelling the forces produced by these respective sets of discs 130 and platters 132, it may be useful to set the platters 132 and discs 130 at different distances within these sets so that, for example, the attractive forces are effective before the counteracting repulsive forces become prevalent.

The magnetic thrust bearing 128 presents significant advantages over prior art thrust bearings. In particular, the thrust discs 130 and platters 132 of the magnetic thrust bearing 128 are designed to oppose lateral movement of the shaft 126 without the frictional losses that arise from conventional contact-based thrust bearings. Additionally, the efficacy of the magnetic thrust bearing 128 does not diminish over time and the magnets 134 can be reused after the useful life of the pumping system 100 has expired.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. An electric submersible pumping system for use in pumping fluids from a wellbore, the electric submersible pumping system comprising:
    a motor;
    a pump driven by the motor; and
    a thrust chamber connected between the motor and the pump, wherein the thrust chamber comprises:
        a housing;
        a shaft; and
        a magnetic thrust bearing, wherein the magnetic thrust bearing comprises:
            a first platter connected to the housing, wherein the first platter produces a first platter magnetic field;
            a second platter connected to the housing, wherein the second platter produces a second platter magnetic field; and
            a first thrust disc connected to the shaft and located between the first platter and the second platter, wherein the first thrust disc produces a first thrust disc magnetic field that opposes both the first platter magnetic field and the second platter magnetic field.
2. The electric submersible pumping system of claim 1, further comprising a second thrust disc connected to the shaft and located within the magnetic thrust bearing such that the first platter is between the first thrust disc and the second thrust disc, wherein the second thrust disc produces a second thrust disc magnetic field that opposes the first platter magnetic field.
3. The electric submersible pumping system of claim 2, wherein each of the first and second thrust discs includes one or more thrust disc magnets.
4. The electric submersible pumping system of claim 3, wherein the one or more thrust disc magnets comprises rare earth magnets.
5. The electric submersible pumping system of claim 4, wherein each of the one or more thrust disc magnets comprise nickel-plated neodymium magnets.
6. The electric submersible pumping system of claim 3, wherein each of the first and second platters includes one or more platter magnets.
7. The electric submersible pumping system of claim 2, further comprising a third platter connected to the housing and located within the magnetic thrust bearing such that the second thrust disc is between the first platter and the third platter, wherein the third platter produces a third platter magnetic field that opposes the second thrust disc magnetic field.
8. An electric submersible pumping system for use in pumping fluids from a wellbore, the electric submersible pumping system comprising:
    a motor;
    a pump driven by the motor; and
    a seal section connected between the pump and the motor, wherein the seal section includes a thrust chamber and wherein the thrust chamber comprises:
        a housing;
        a shaft; and
        a magnetic thrust bearing, wherein the magnetic thrust bearing comprises:
            a plurality of platters connected to the housing, wherein each of the plurality of platters produces a platter magnetic field; and
            a plurality of thrust discs, wherein each of the plurality of thrust discs is interleaved between an adjacent pair of the plurality of platters, and wherein each of the thrust discs produces a thrust disc magnetic field that opposes the platter magnetic fields produced by each of the adjacent pair of the plurality of platters.
9. The electric submersible pumping system of claim 8, wherein each of the plurality of thrust discs includes one or more thrust disc magnets.
10. The electric submersible pumping system of claim 9, wherein each of the one or more thrust disc magnets comprise nickel-plated neodymium magnets.
11. The electric submersible pumping system of claim 8, wherein each of the plurality of platters includes one or more platter magnets.
12. The electric submersible pumping system of claim 11, wherein each of the one or more platter magnets on the one or more platters comprise nickel-plated neodymium magnets.
13. A magnetic thrust bearing for use in a pumping system that includes a pump driven by a motor through a shaft, the magnetic thrust bearing comprising:
    a plurality of platters, wherein each of the plurality of platters produces a platter magnetic field; and
    a plurality of thrust discs, wherein each of the plurality of thrust discs is interleaved between an adjacent pair of the plurality of platters, and wherein each of the thrust discs produces a thrust disc magnetic field that opposes the platter magnetic fields produced by each of the adjacent pair of the plurality of platters.

14. The magnetic thrust bearing of claim 13, wherein each of the plurality platters further includes a central aperture that allows the shaft to pass through each platter without causing the platter to rotate with the shaft.

15. The magnetic thrust bearing of claim 14, wherein each of the plurality of platters includes a plurality of platter magnets and wherein each of the plurality of thrust discs includes a plurality of thrust disc magnets, and wherein the platter magnets and thrust disc magnets are permanent magnets.

16. The magnetic thrust bearing of claim 15, wherein each of the platter magnets and thrust disc magnets comprise nickel-plated neodymium magnets.

17. The magnetic thrust bearing of claim 15, wherein each of the plurality of thrust disc magnets extends from one side of the thrust disc to the other side of the thrust disc.

18. The magnetic thrust bearing of claim 15, wherein each of the plurality of platter magnets extends from one side of the platter to the other side of the platter.

19. The magnetic thrust bearing of claim 13, wherein the pumping system further includes a thrust chamber that has a thrust chamber housing, and wherein each of the plurality of platters is secured to the thrust chamber housing.

20. The magnetic thrust bearing of claim 13, wherein the pumping system further includes a seal section having a housing, and wherein each of the platters is secured to the seal section housing.

* * * * *